United States Patent

[11] 3,626,060

[72] Inventor Nathaniel Grier
    Englewood, N.J.
[21] Appl. No. 2,388
[22] Filed Jan. 12, 1970
[45] Patented Dec. 7, 1971
[73] Assignee Merck & Co., Inc.
    Rahway, N.J.
    Continuation-in-part of application Ser. No. 733,748, May 29, 1968, which is a continuation of application Ser. No. 417,506, Dec. 10, 1964, now abandoned, Continuation-in-part of application Ser. No. 758,555, Sept. 2, 1958, now abandoned, Continuation-in-part of application Ser. No. 231,813, Oct. 19, 1962, now Patent No. 3,297,525. This application Jan. 12, 1970, Ser. No. 2,388
    The portion of the term of the patent subsequent to Jan. 10, 1984, has been disclaimed.

[54] AGRICULTURAL COMPOSITIONS AND PROCESS FOR UTILIZING SAME
    6 Claims, No Drawings

[52] U.S. Cl. .................................................... 424/232
[51] Int. Cl. .................................................... A01n 9/22
[50] Field of Search ........................................ 424/232

[56]  References Cited
    UNITED STATES PATENTS
    2,411,670  11/1946  Senn ............................ 260/289
    2,666,058  1/1954   Neher ........................... 260/287
    3,297,525  1/1967   Grier ............................ 424/232

Primary Examiner—Jerome Goldberg
Assistant Examiner—Vincent D. Turner
Attorneys—Frank M. Mahon, I. Louis Wolk and J. Jerome Behan ABSTRACT: Antimicrobial compositions containing salts of an organic carboxylic ester of an hydroxyquinoline and a salicylic acid are useful antimicrobials for agricultural applications.

AGRICULTURAL COMPOSITIONS AND PROCESS FOR UTILIZING SAME

The present application is a continuation-in-part of my prior copending application Ser. No. 733,748, filed May 29, 1968, which is a continuation of my prior application Ser. No. 417,506, filed Dec. 10, 1964, now abandoned, which in turn is a continuation-in-part of my prior applications Ser. No. 758,555, filed Sept. 2, 1958, now abandoned, and Ser. No. 231,813, filed Oct. 19, 1962, now U.S. Pat. No. 3,297,525.

The present invention relates to improved antimicrobial compositions for use in agriculture, as for the treatment of the soil, and also of seeds, plants and foliage, including the crop at any stage of its growth.

It is the general object of the invention to provide antimicrobial compositions characterized by a high degree of effectiveness in relatively low concentrations, against various fungi and bacteria encountered in agriculture, this high activity being coupled with the complete absence of phytotoxicity within the effective range of antimicrobial activity.

The present invention is of particular utility in the treatment of soils infected or subject to injection by various destructive fungi, while at the same time there is obtained by its use a pronounced growth-stimulating action producing not only an abundant root system but also a luxuriant growth above ground, this being accompanied by a substantial increase in the yield of the crop per acre as compared not only with untreated soils, but also with other, widely used soil fungicides.

It is accordingly a further object of the invention to provide soil fungicides which are characterized by a high degree of effectiveness, so that comparatively small amounts thereof need be applied per acre, while at the same time no damage to the seeds or roots is caused but on the contrary an unusually luxuriant growth of root systems in plants of various kinds is promoted and likewise a heavy and high crop-yielding growth both below and above ground.

It is also an object of the invention to provide a soil fungicide which can be be marketed in a highly concentrated form and is adapted for easy dilution with large quantities of water in which it is quite homogeneously distributed for uniform application to large areas by spraying, by injection, or otherwise.

It is a still further object of the invention to provide fungicidal (and fungistatic), and bactericidal (and bacteristatic) preparations which can be used both for soil sterilization and for protection of seeds upon planting as well as in storage, and also on the foliage and fruit or vegetable crops themselves, for promoting a high percentage of germination and a healthy and abundant, and even supernormal growth.

Other objects and advantages of the invention will appear from the following more detailed description thereof.

In accordance with the present invention there are employed as soil, seed and plant (including crop) fungicides and bactericides (by which terms are understood also fungiastats and bacteriastats), the addition compounds or salts of various salicylic acids, including salicylic acid itself, with organic carboxylic acid esters of hydroxyquinolines, and particularly of 8-hydroxyquinoline, also known as "oxine." The organic carboxylic acid can be monobasic or polybasic, and it can be of aliphatic, aromatic or heterocyclic nature.

The compounds providing the active component of the compositions of the present invention are comprised within the following general formula:

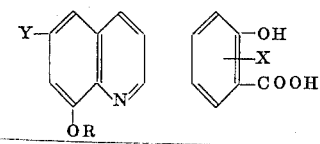

wherein: R is the acyl group of an organic carboxylic acid; X is hydrogen or any group devoid of an acidic hydrogen, such as alkyl, or alkenyl or alkoxy, preferably a lower group of homologs having from one to eight carbon atoms, any of the halogens but preferably chlorine and iodine, nitro, cyclic hydrocarbons such as cyclopropyl, cyclohexyl, cyclopentyl, and other cycloaliphatic groups having from three to eight carbons, phenyl and the like; which may themselves be substituted as just indicated, e.g. chlorinated phenyl; Y is hydrogen or any group devoid of acidic hydrogen, i.e. having a hydrogen-donating potential greater than the phenolic hydroxyl of the salicylic acid, such as the substituents above listed for the salicylic acid, such as the substitutents above listed for the salicylic acid nucleus, particularly cyclopropyl, cyclopentyl and cyclohexyl, and also furyl and other heterocycles.

In place of salicylic acid and its derivatives as above defined there can be employed the analogous o-hydroxynaphthoic acids, e.g., 2, 3-hydroxynaphthoic acid and its corresponding derivatives.

The esterifying organic carboxylic acid can be of great variety and can, for example, be any of the aliphatic, cycloaliphatic, aryl, aryl-lower aliphatic and heterocyclic carboxylic acids, monobasic or polybasic, and including hydroxy acids, both in the lower range of carbon atoms (one to eight and in the higher range nine to 22 carbon atoms) in the case of the aliphatic acids, such as acetic, propionic, butyric, t-butyl acetic, hexoic, lauric, myristic, palmitic, stearic, behenic, malonic, malic, maleic, angelic, succinic, citric, tartaric, cyclohexyl and cyclopentyl acetic and propionic acids, and the like. The aromatic acids include benzoic, phthalic, terephthalic, isophthalic, cinnamic, phenyl acetic, phenyl propionic, naphthoic, and the like; while the heterocyclic acids include furoic, pyridyl carboxylic, and pyridyl acetic acids. In the choice of an acid, both as the esterifying acid and as the salicylic acid derivative, it is important not to employ one having a substituent with a hydrogendonating potential at least equal to that of the hydroxyl group of the salicylic acid, and preferably one devoid of any group containing an acidic hydrogen.

As indicated by the general formula hereinabove, not only the salifying acid but also the quinoline ester moiety can be nuclearly further substituted by one or more groups free of acidic hydrogens, that is, groups having no hydrogen-donating potential substantially equal to or greater than the hydroxyl of the salicylic acid. Thus in place of 8-hydroxyquinoline-oxine in the formation of the esters, such as the benzoic ester, there may be employed 5-chloro-7-iodo-oxine, 5,7-diiodo-oxine, 5,7-dibromo-oxine, 5-methyl-oxine, 5-chloro-7-ethyl-oxine, 3-methyl-5-chloro-7-iodo-oxine and 4-methyl-5,7-dibromo-oxine. Specific examples of substituted salicylic acids employed for forming the salts of oxine and its nuclearly substituted derivatives are 3,5-diiodosalicylic acid, 4-methyl salicylic acid, 3-hexyl and 3-cyclohexyl salicylic acid, 3-phenylsalicylic acid, and 3,5-dinitrosalicylic acid.

Also, the alkyl, aryl or heterocyclic radicals of the ester groups can themselves be substituted; in the case of the alkyl radicals by halogen or nitro, or by halogen, lower alkyl or nitro in the case of cycloaliphatic, aromatic or heterocyclic carboxylic acids. Examples of these are the salicylates (unsubstituted or substituted as above described) of the p-chloro cyclohexyl carboxylic acid ester of oxine, the p-nitrobenzoic acid ester, the α-nitrofuroic acid ester, the o-ethyl and o-chloro-benzoic acid ester, the 2-chloro-propionic acid ester, and the like.

The compounds employed in the compositions of the present invention have shown unusual activity in the destruction and inhibition of fungi and bacteria while being at the same time nonphytotoxic within their active concentrations and are indicated for the protection of soils, seeds, roots, plants and their crops against fungal and bacterial infestation and attack. Field tests with, for example, 8-benzoyloxyquinoline salicylate, have shown a remarkable increase in the size and health of the root systems and in the above-soil growth, the latter being thick and luxuriant as distinguished from the tall but spindly growths obtained with many known plant stimulants and hormones. In addition, the crop, besides being in greater yield than heretofore obtainable even with the aid of known antimicrobial agents, is of excellent and superior quality.

A further advantage which distinguishes the preparations of the present invention from many known and commercially employed fungicides is that, whereas the latter have very unpleasant odors and/or are severe lachramators and/or have a high vapor pressure, so that they must be rototilled into the soil within a few hours after application to prevent loss of effectiveness, the compounds of the present invention are easy to handle, have no odor, have no lachramatory effect, and do not have a high vapor pressure.

A still further advantage of the compounds employed in the present invention arises from the fact that they are free of toxic metals, like mercury and copper, so that such metals do not accumulate in the soil with repeated use.

Among the compounds within the scope of the invention which have been found to be active against various destructive fungi and bacteria are the following:

8-Benzoyloxyquinoline 4-methylsalicylate.
5,7-Diiodo-8-benzoyloxyquinoline salicylate.
3-Methyl-8-benzoyloxyquinoline salicylate.
4-Ethyl-8-benzoyloxyquinoline salicylate. 8-Benzoyloxyquinoline 3,5-diiodosalicylate. 8-Benzoyloxyquinoline 3,5-dinitrosalicylate.
8-Benzoyloxyquinoline 3-phenylsalicylate.
Di-8-quinolinyl phthalate di-3,5-diiodosalicylate.
8-Quinolinyl cinnamate salicylate and 3,5-diiodosalicylate.
8-Quinolinyl acetate salicylate.
8-Quinolinyl phenylacetate salicylate and 3,5-dinitro salicylate.
8-Quinolinyl propionate salicylate.
8-Quinolinyl phenylpropionate salicylate.
8-Quinolinyl butyrate salicylate and 3,5-dinitrosalicylate.
8-Quinolinyl palmitate salicylate.
8-Benzoyloxyquinoline 4-methylsalicylate.
8-Quinolinylcyclohexylcarboxylate salicylate.
Di-8-Quinolinyl phthalate di-4-methylsalicylate.
5,7-Dibromo-8-benzoyloxyquinoline 5-chlorosalicylate and 3,5-diiodosalicylate.
8-Benzoyloxyquinoline 5-chlorsalicylate.
5-Chloro-7-iodo-8-benzoyloxyquinoline salicylate, 5-chlorosalicylate, and 3,5-diiodosalicylate.
5,7-Diiodo-8-benzoyloxyquinoline salicylate, 5-chlorosalicylate, and 3,5-dinitrosalicylate.
5,7-Dibromo-8-benzoyloxyquinoline salicylate and 3,5-diiodosalicylate and 3,5-dinitrosalicylate.
8-Quinolinylcyclohexylacetate salicylate.
8-Quinolinyl-(o-ethyl)-and (o-chloro)-benzoate salicylate.
8-Quinolinyl-(2-chloro)-propionate salicylate.
8-Quinolinylveratrate salicylate.
8-Quinolinylfuroate salicylate, and the α-nitrofuroate.
Di-8-quinolinylmalonate di-salicylate.
Di-8-quinolinylsuccinate di-salicylate.
8-p-Nitrobenzoyloxyquinoline salicylate.
8-Quinolinyl t-butyl acetate salicylate.
8-Quinolinyl laurate salicylate and 3,5-diiodosalicylate.
8-Quinolinyl-p-chlorocyclo-hexylcarboxylate salicylate.

An antimicrobial compositions suitable for agricultural application which contain the fungicidal and bactericidal compounds of this invention may be compounded in a variety of conventional agricultural formulations including dusts, emulsions, sprays, pastes, viscous suspensions, wettable powders and the like. Such formulations are prepared by techniques well-known in the art by intimately blending the active compounds of this invention with one or a mixture of solid or liquid agricultural carriers including diluents, suspending agents, wetting agents, spreading agents, other surface active agents, stabilizers emulsifiers, spreaders, conditions, adhesives and the like.

For use in the form of a dust, the compounds of this invention may be blended with any suitable proportion of a variety of excipients including diluents, suspending, spreading, dispersing, and wetting agents and other adjustments in pulverulent condition (preferably below 50 micron particle size.) Usually, the inert carrier will range in percentage composition from about 1 to 80 percent of the total composition and will include about one to five parts of a dispersing agent for 100 parts of active compound.

Suitable diluents include nature clays such as china clays, talc, bentonite, attapulgites and other similar inert material, and also pyrophyllites, diatomaceous earth, fuller's earth, chalk, rock phosphates, and also chemically modified minerals such as acid-washed bentonite, precipitated calcium phosphate and carbonate, colloidal silica, mica, pumice, vermiculite, wood flour, and grain flours. There can also be employed inert metal oxide and hydroxides such as titanium dioxide, aluminum oxide, and bauxite. Diluents such as clays, talc, bentonite and other mineral powders may be oil treated to increase their adhesivity; the oil being either a mineral hydrocarbon oil or a vegetable oil or an animal fatty oil.

Suspending agents can also be included in the composition, such as sodium or calcium salts of lignin sulfuric acids. Conditioning agents which may be employed include sodium phosphate or polyphosphate, various alkoxy celluloses, such as methyl cellulose and other cellulose ethers, and the sodium self of cellulose glycollic acid.

Various surface active agents can be included in the formulations particularly where application as a spray in water is desired. Suitable surface active agents include both cationic and nonionic compounds such as sodium alkyl sufates ("Dreft"), alkyl and alkyl-aryl sulfonates ("Nacconal N. M." and Dupont "MP-189"), alkyl-aryl polyester alcohols ("Spans"), and ethylene oxide addition products ("Tweens"). The nonionics are the preferred surfactants and include alkylphenol-ethyleneoxide condensation products such as isooctylphenol-polyethylene oxide condensates ("Triton X-100"), the various "spans" (sorbitan monopalmitate, stearate or oleate) and "Tweens" (e.g. sorbitan monolaurate—"Tween 20"). These materials can constitute from 0.05 to 10 percent of the active agents.

It is sometimes desirable to include an adhesive in the composition in the range of about ½ to 5 percent of the active material. These adhesives can be in the form of resins which are soluble or dispersible in water, and include cellulose ethers, waxes, polyvinyl pyrrolidine, and powdered polyethylene. Sticking agents may also be included in small proportion (about ½ to 5 percent of the active substance), these including glycerin and nonvolatile polyethylene glycols.

These formulations may be diluted with water and applied to the soil. Adjuvants can be mixed with the active material before use or they may be sold as such in the dry condition admixed with the active material. The mixture then may be added to water just prior to use.

The surfactant, emulsifying, suspending and conditioning agents all, both singly and in admixture, serve the function of uniformly distributing the oxine ester salicylate either in the aqueous or organic emulsions, suspensions, and other marketed concentrates, or on mixing with water by the user to produce a uniform mixture for application to the soil, seeds or plants.

The ester-salicylates can be sold to the farmer or other user in the form of a powder, where they are solid or in a liquid form or paste, both when the compounds are solids and when they are liquid at ordinary temperatures. Thus the solid ester-salts can form part of a 50 percent wettable powder, mixed with about 50 percent of a filler in the form of clay, starch, refined calcium silicate powder, or other more or less inert material, to facilitate uniform distribution over large areas. Preferably, the solid contains about 1 percent of the total weight in the form of a wetting agent of any known type which is nonreactive towards the ester-salt.

For formulating wettable powders, various adjuvants and surface active agents can be employed such as are listed in Soap and Chemical Specialties, Volume 31, Number 7, p. 61 Ed. Seq.; No. 8 pp. 48–61; No. 9, pp. 52–57 and No. 10 pp. 38–67 (1955) and in Bulletin No. 607 of the Bureau of Entomology and Plant Quarantine, Department of Agriculture Washington, D.C. The surface active agents include detergents of various kinds, wetting agents, solublizing agents, stabilizers, dispersing agents, emulsifying agents, spreaders, conditions, stickers (to aid in resisting leaching). Carboxy methyl cellulose is a highly satisfactory material for use as a thickening or conditioning agent.

In the form of liquid concentrates, the active component can comprise from 5 to 95 percent by weight of the composition, the remainder being the liquid carrier which can include any of the additions above discussed. The powders above described may contain oils of various kinds or other substances to improve the adhesion to plant surfaces. The powders preferably contain wetting agents when they are intended for mixing with water and can contain from 5 to 90 percent of the active material together with the solid diluent and a suspending and wetting agent. Various other additives or adjuvants may be included as above described. The emulsion above described can contain a small proportion of water to facilitate subsequent mixing with water should that be desired.

When dry, the antimicrobial compounds can be mixed with mildly alkaline carriers like calcium carbonate. However, in suspension in a liquid medium, it is recommended that amines and other basic materials not be included as these would neutralize the salicylic acid. It is generally also not desirable to employ alcohol in a liquid composition when the latter is to be kept on the shelf for a considerable time; however, the compositions can be mixed with alcohol or alcohol-water mixtures just prior to use.

It is desirable at times to use a volatile solvent as a carrier for the active compounds of this invention, for example hexane, which evaporates a short time after application to the soil.

The compositions of the present invention in the form of any suitable formulation, either as a dust or as a liquid, can be applied directly to seed at nonphytotoxic concentrations. For spraying seeds with the fungicide composition there can be employed nonphytotoxic oils like refined mineral oil or nondrying or only partially drying vegetable oils like caster oil, olive oil, soy bean oil, and the like. The spray composition in slurry form can include in addition to various proportions of water, also benzene, chlorobenzene, higher dialkyl ethers, like dibutyl ether, while fluoro-trichloro-methane, dichloro-difluoro-methane, and other highly volatile liquids can be employed for aerosol sprays, such sprays being especially useful for treatment of hard to get at regions, household plants, tree wounds, or where it is desired to have no residual solvent. Suitable oils for suspending the fungicides are diesel engine oil and Stoddard solvents, which include the higher boiling petroleum fractions, like the higher boiling range naphthas.

The various additions above described can be considered as homogenizing agents which keep the ester-salts in uniform suspension in the concentrated form in which they are preferably marketed, and also promote uniform suspension in the much larger volumes of water with which they are to be mixed prior to application to the soil.

The compositions can include various insecticides which are nonreactive with the fungicide.

Typical formulations are presented below, but it is to be understood that they are given by way of illustration only and not as indicating the scope of the invention.

Example A

Wettable Powder

| | Parts by Weight |
| --- | --- |
| 8-BEnzoyloxyquinoline salicylate | 50 |
| Finely particled clay | 48 |
| Alkyphenoxypolyethoxyethanol | 2 |

Five to 10 lbs. of the above mixture are stirred into 30 to 60 gallons of water per acre and sprayed or injected into the soil and the latter rototilled to a depth of 3 inches, after which the seeds are planted.

Example B

Emulsifiable Liquid

Parts by Weight

| | |
| --- | --- |
| 8-Benzoyloxyquinoline salicylate | 5 |
| Dipropyleneglycolmonomethyl ether | 50 |
| Anhydrous xylene | 40 |
| Alkylphenoxypolyethoxyethanol | 5 |

Fifty to 100 lbs of the liquid preparation are emulsified with 30 to 60 gallons of water acre for distribution in the soil to a 3 inch depth.

Example C

Dispersible Paste

Concentrated pastes may be prepared by mixing finely powdered 8-benzoyloxyquinoline salicylate with methylcellulose and small amounts of sodium ligninsulfonate. The resulting powder blend is then stirred with sufficient water to give pastes of desired viscosity.

| | |
| --- | --- |
| 8-Benzoyloxyquinoline salicylate | 95 |
| Methylcellulose | 2 |
| Sodium Ligninsulfonate | 3 |

The paste, which is prepared by simply mixing the power with cold water, can then be used to make dispersions in water by simple dilution. The resultant suspensions can then be used as agricultural sprays.

Generally, it is best to apply the composition to the top of the ground and then turn the soil over. Thus 60 gallons of water can contain 5 pounds of the active substance to be applied per acre, this yielding 5 p.p.m. when the soil is turned over to a depth of 3 inches. (At a 3 inch depth, 1 pound of antibacterial substance per acre is equivalent approximately to 1 p.p.m.) In the case of cotton, for which the soil need be turned over for only a 2" depth, a correspondingly smaller amount of the active compound need be used. On the other hand, when the soil is plowed or turned over to a depth of 6", as for potatoes, a correspondingly larger amount is used.

As above indicated, the active material can be applied either in the form of a slurry or suspension or as a dust.

As disclosed above, the compounds of the invention are not phytotoxic in the effective ranges in which they are to be used. The concentrations at which damages to seeds or plants occurs is so much higher than the effective ranges that the danger is practically nonexistent in view of the large spread between the effective and phytotoxic concentrations.

Both in the powdered and in the liquid forms, the compositions of this invention can be used as seed dressing to destroy seed-borne fungus spores and bacteria, both to increase the percentage germination and to protect the young plants and root systems. Further, young plant roots can be dipped in such compositions to protect them against fungal attack.

The compositions of the present invention can be used with advantage in sterilizing the soil on which are grown various vegetables, fruits and other agricultural products, such as beans, soy beans, sugar beets, carrots, cucumbers, cabbage, corn, peanuts, tomatoes, cotton, alfalfa, oats and clover, among others, and can also be applied to seeds and plants to protect them against destructive micro-organisms.

The compositions according to the present invention possess not only antifungal but also antibacterial activity. Thus they have been found to be effective against *Verticillium* wilt and other blights that affect tomatoes. They are effective also against the fungi causing potato scab.

The new compositions are effective also against the various fungi that infest fruit trees. Thus apple trees can be sprayed, before fruit set, with an aqueous suspension of the salicylate salt, prepared by mixing, say, 100 gallons of water with an amount of the commercially prepared composition containing the 8-benzoyloxyquinoline salicylate or other ester-salt embraced in this specification such that 5 to 20 p.p.m. of the ester-salt are contained in the spray suspension. In this way there can be controlled, for example, the apple scab fungus *Venturia inaequalis*. Other fruit trees like peach and cherry, can be treated in similar fashion.

The compound 8-benzoyloxyquinoline salicylate has shown extraordinary effectiveness especially against the soil and seed-borne micro-organisms which attach the roots and foliage of various species of beans. As is known, vast areas have been rendered unprofitable for the growth of bean crops in the United States because known antimicrobial agents have proved ineffective in controlling the fungi and bacteria infesting such areas. The immense regions devoted to the growth of bean crops in Central and South American countries, where beans are the staple crop, have had to be cultivated despite poor yields per acre with crops of poor quality. Tests conducted with the above-named compound have shown that the destructive micro-organisms can be controlled therewith and much higher yields are obtained and at the same time a product of better quality and uniformity. The field tests have established that the compound is far more effective as an antifungal agent in the soil than was indicated by *in vitro* tests in the laboratory.

Tests have been conducted also with a variety of other crop-producing plants with surprising results both in view of the relatively low concentration of the antimicrobial composition necessary to inhibit fungal and/or bacterial growth, but also with respect to the quality of the crop and in many cases also the increased size of the crop. Tests have been conducted on corn, (Penn. 290), soy-beans (Clark) peanuts, cotton (Coker 100A), sugar beets, cabbage, tomatoes (Rutger), cucumbers (Early Fulton), alfalfa (Dupuit), clover (Pennscott) and oats (Gary). With all of these crop-producing plants a markedly enlarged root system, as well as an abundant and healthy growth above ground was obtained.

The salicylic acid salts (by which term is to be understood also the substituted salicylic acid salts) of the carboxylic acid esters of oxine and substituted oxines have shown a useful activity at about 1 pound per acre and very good activity at 2½ to 5 pounds per acre. Phytotoxic damage occurs at about 10 pounds per acre in the case of the salicylate of oxine benzoate, and the useful range is generally from about 1 to 5 pounds per acre but with some compounds may be considerably higher.

In tests conducted on red kidney beans in standard fashion with a control plot in the immediate vicinity which received no fungicide and with as identical as possible comparison plots wherein there was utilized a well-known commercial agricultural fungicide, the salicylate salt of oxine benzoate showed a decided advantage from the standpoint of yield of crop, percentage of the plants having undamaged ("clean") roots, and requisite poundage of the fungicide per acre.

The salicylate salt exhibited an activity even at 1 pound per acre, and showed decided superiority at 2½ and 5 pounds per acre, these three groups of plots yielding plants which averaged 27.1 percent, 59.9 percent, and 61.2 percent, clean, respectively, i.e. free of fungal attach, whereas the untreated plots had an average of only 19.2 percent of plants having clean roots. The tests were conducted on the soil on which kidney beans were planted towards the end of June and because of a very early freeze, the crop had to be harvested early, namely, on Sept. 11. Nevertheless there was a 25 percent increase in the crop on a weight basis on the plots which had been treated with the salicylic acid salt of oxine benzoate at the rate of 2½ pounds per acre. It has been expertly estimated that the probable increase in the crop yield of kidney beans planted earlier and harvested later, as is the general practice, would be of the order of 50 to 60 percent as compared with untreated soil.

These results contrasted with those obtained with a known soil fungicide which averaged only 36.1 percent of clean plants when applied at the rate of 20 pounds per acre, while at 40 pounds of this fungicide per acre the average yield of clean plants was only 58.0 percent. The improved results with much lower concentrations in the case of the composition of the present invention are thus evident.

Plots sown with harvester beans and treated with 8-benzoyloxyquinoline salicylate showed definite stimulation of bean growth. At a concentration of only 5 parts per million the percentage of plants having clean roots was as high as 95.6 percent, averaging 90.0 percent in four separate tests. At 10 p.p.m. the average was 82.4 percent while at 25 p.p.m. the percentage of plants with clean roots rose to 98.0 percent but dwarfing was noted in two of the replicas. The untreated plots yielded plants which on the average had only 36.3 percent of clean roots.

In tests carried out with 8-benzoyloxyquinoline salicylate on early fulton cucumbers, best results were obtained when the composition was applied at a concentration of 10 p.p.m., a high quality of crop being obtained with a substantial increase in the yield over untreated plots.

In tests for phytotoxicity on soy beans, cotton, sugar beets, tomatoes, cucumbers, alfalfa, oats and clover it has been found that no damage to the plants occurred when up to 10 parts per million to a 3 inch depth of soil, of the 8-benzoyloxyquinoline salicylate were applied. Cotton, sugar beets, tomatoes, alfalfa and clover showed no damaged plants at a concentration of 20 p.p.m., while the others showed at most only slight dwarfing at such dosage.

Depending upon the part of the plant that is attacked by the various bacterial diseases, either the seed or the above soil foliage and fruit, or the vegetables in storage, can be protected by treatment directly with a composition according to the present invention which when applied contains from about 5 to about 95 percent of the active compound. For protection against bacterial attack the seeds of cucumbers can be directly treated against angular leafspot, caused by *Pseudomonas lachrymans;* the seeds can be protected also by way of treatment of the soil at planting time, as described above. In the case of eggplant blight, caused by *Phomopsis vexans,*or bacterial spot in peppers caused by *Xanthomonas vesicatoria,*it is best to treat the seed directly. In the case of lima beans the plant is treated for bacterial blight caused by *Xanthomonas phaseoli,*and the bacterial blight of celery caused by *Pseudomonas apii* is similarly inhibited. Various species of beans can be protected against halo blight caused by *Pseudomonas phaseolicola,*the plant itself, i.e. the foliage, being also treated with the active compositions. Either the seed or the soil can be treated to protect tomatoes against the bacterial canker caused by *Corynebacterium michiganese,*and against the bacterial spot caused by *Xanthomonas vesicatoria*. Where the soil itself is treated the applied concentrations are preferably of the order of about 1 to 40 p.p.m., although as stated above the requisite concentrations will generally be below the indicated maximum. In the case of carrots, the crop itself can be treated with the compositions of the invention to protect it against bacterial soft rot caused by *Erwinia caratovora* and also against leaf blights.

Methods for the preparation of the active antimicrobial compounds are disclosed in my above-mentioned applications and are incorporated herein by reference. Two procedures for the preparation of the presently preferred compounds are reproduced below by way of illustration, but it will be understood that the other compounds disclosed herein can be manufactured by analogous procedures.

EXAMPLE 1

8-Quinolinyl benzoate—Salicyclic Acid Salt

One hundred twenty-four grams 8-quinolinyl benzoate (m.p.123°–° C.) and 70 g. salicylic acid were dissolved in 1,200 ml. 99 percent isopropyl alcohol by heating and stirring. On slow cooling thick colorless needles gradually formed. After 12 hours the product was removed by suction filtration, washed with 99 percent isopropyl alcohol, and air-dried. The yield was 130 grams of colorless product.

For analysis a sample was recrystallized from 99 percent isopropyl alcohol, m.p. 135.6°–136.6° (Anschutz thermometer). Carbon, hydrogen and nitrogen values were in excellent agreement for the composition $C_{16}H_{11}O_2N.C_7H_6O_3$,mol.wt. 387.

EXAMPLE 2

Di-8-quinolinylphthalate-Di-salicylic Acid Salt a. Di-8-quinolinyl phthalate Thirty g.(0.21 mole) 8-hydroxyquinoline were dissolved in 120 g. anhydrous pyridine in a 500 ml. 3 neck round bottom flask equipped with a thermometer, dropping funnel, agitator, cooling bath, and vented to the atmosphere through a calcium chloride drying tube. The internal temperature was maintained at 10° to 15° C. and over a period of 1½ hours there were then added dropwise 25 g. (0.12 mole) phthalyl chloride. After complete addition, the mixture was agitated an additional 1½ hours at 15° to 20° C. It was then poured into 500 ml. water, stirred thoroughly and allowed to stand overnight. The small excess of phthalyl chloride which remained was thus converted to phthalic acid, and this remained in solution as the pyridine salt. The di-8-quinolinyl phthalate was removed by suction filtration, washed well with water, and air-dried at room temperature. A yield of 35 g. (80 percent) was obtained. The product was crystallized from benzene ( 35 g. in 400 ml.) to give large, colorless prisms, melting point 178°–180° C. to a clear colorless melt. Analysis for carbon, hydrogen and nitrogen confirmed the composition $C_{26}H_{16}O_4N_2$, molecular weight 420.

Di-8-quinolinyl phthalate is colorless, odorless, poorly soluble in water, and slightly soluble in methyl or 99 percent isopropyl alcohol. On boiling a suspension of the product in water, no color is observed. Testing of the liquor with ferric chloride showed that no 8-hydroxyquinoline had been liberated. However, di-8-quinolinyl phthalate is readily soluble in dilute aqueous hydrochloric acid and on heating, rapid hydrolysis results, the thus-formed 8-hydroxyquinoline hydrochloride causing a strong yellow coloration. In water made alkaline by the addition of monoethanolamine, the di-8-quinolinyl phthalate was stable even at the boiling point.

The use of the above preparative procedure gives rise to only one product, di-i-quinolinyl phthalate, even under conditions that should favor the formation of mono-8-quinolinyl acid phthalate.

Di-8quinolinolphthatate—Di-salicylic Acid Salt 8.4 g. (0.02 mole) Di-8-quinolinyl phthalate were dissolved in 150 ml. boiling benzene. To this there were added 5.5 g. (0.04 mole) salicylic acid. A clear solution resulted. On cooling and scratching a white crystalline precipitate was obtained. After standing 2 hours, the product was filtered, washed with benzene and air-dried. Yield 12 g. of colorless crystals. This was recrystallized from benzene, m.p. 140°–142° C. (Anschutz Therm.) Analysis for carbon, hydrogen, and nitrogen gave excellent agreement for $C_{26}H_{16}O_4N_2 \cdot 2C_7H_6O_3$, molecular weight 696.

The subject matter which applicant regards as his invention is particularly pointed out and distinctly claimed as follows:

What is claimed is:

1. A composition for agricultural use which comprises 5 to 95 percent of a salt of an ester of a 8-hydroxyquinoline and a salicylic acid devoid of any substituent having a hydrogen donating potential at least equal to that of the hydroxyl group of such acid and the ester being of an organic carboxylic acid and an agricultural carrier therefor.

2. A composition according to claim 1 wherein the ester-salt is the salicylic acid salt of 8-quinolinylbenzoate.

3. The composition according to claim 1 wherein the ester-salt is the di-salicylic acid salt of di-8-quinolinylphthalate.

4. A method for protecting soil, seeds, plants and crops against destructive fungi and bacteria which comprises applying thereto an antifungal and antibacterial quantity of a composition comprising 5 to 95 percent of a salt of an ester of a 8-hydroxyquinoline and a salicylic acid devoid of any substituent having a hydrogen-donating potential at least equal to that of the hydroxyl group of such acid and the ester being of an organic carboxylic acid and an agricultural carrier therefor.

5. A method according to claim 4 wherein the ester-salt is the salicylic acid salt of 8-quinolinylbenzoate.

6. A method according to claim 4 wherein the ester-salt is the di-salicylic acid salt of di-8-quinolinylphthalate.

* * * * *